March 28, 1950
P. GRIVET
2,502,146
ELECTRON MICROSCOPE PROVIDED WITH
A PROJECTING MIRROR
Filed Jan. 15, 1948
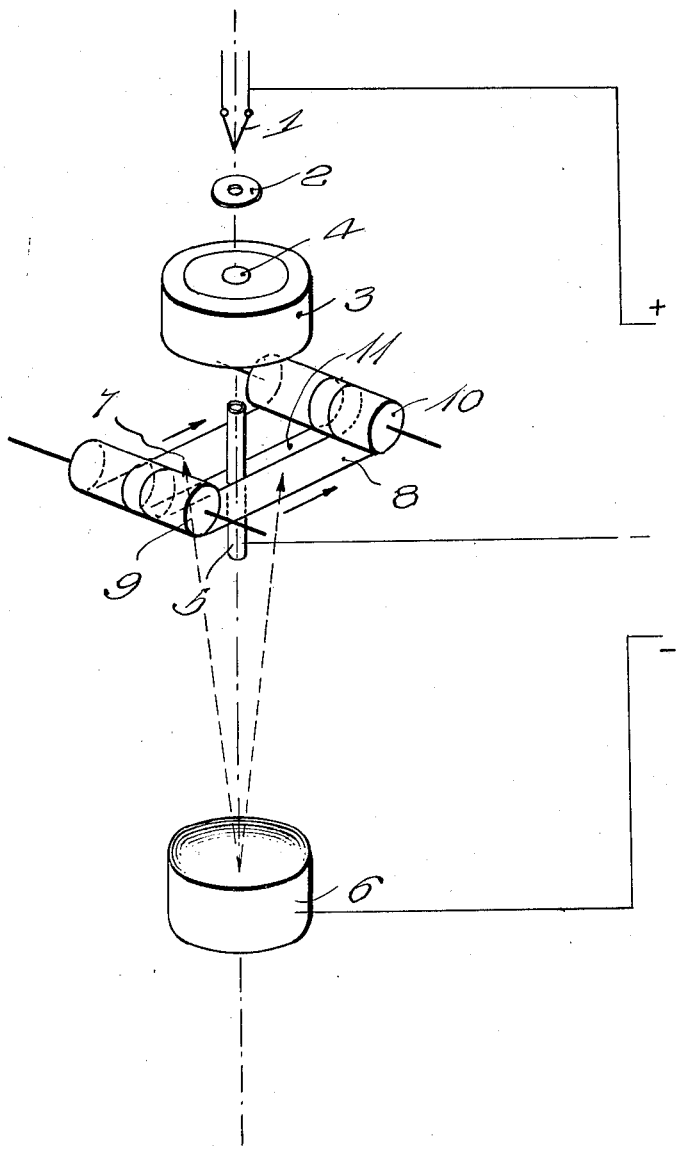
INVENTOR.
Pierre Grivet,
BY
John B. Brady
ATTORNEY Patented Mar. 28, 1950

2,502,146

UNITED STATES PATENT OFFICE 2,502,146

ELECTRON MICROSCOPE PROVIDED WITH A PROJECTING MIRROR

Pierre Grivet, Paris, France, assignor to Compagnie Generale de Telegraphie sans Fil, a corporation of France Application January 15, 1948, Serial No. 2,487
In France October 14, 1946

Section 1, Public Law 690, August 8, 1946
Patent expires October 14, 1966

3 Claims. (Cl. 250—49.5)

My invention relates broadly to electron microscopes and more particularly to an improved projection system for electron microscopes.

One of the objects of my invention is to provide an improved electronic projection system for increasing the efficiency of electron microscopes.

Another object of my invention is to provide means for establishing photographic registration on sensitive films of the final image formed by the beam after reflection on an electron mirror.

Other and further objects of my invention reside in the arrangement of electronic discharge system for electron microscopes as set forth more fully in the specification hereinafter following by reference to the accompanying drawing which shows in perspective view the arrangement of the parts of the electron discharge system in the electron microscope of my invention.

It is well known that it is advantageous, in certain applications, to build electron microscopes in the following manner:

(1) The objective consists, according to the conventional arrangement, of an electrostatic or an electromagnetic lens.

(2) In the second amplifying stage, the conventional projecting lens is replaced by an electrostatic magnifying lens; the final image is then reflected to the neighborhood of the objective. With the said type of construction, a narrow beam of primary electrons, issuing from the objective, at first forms at the focus of the mirror an intermediate image, the largest dimension of which measures a few millimeters. The mirror then reflects the incoming rays in the form of a so-called secondary beam; the said rays are reflected, i. e. turned back, and so dispersed that they form a final image of magnified dimensions, the largest one of those latter measuring for example, only a few centimeters.

In short, the distance comprised between the objective and the mirror is covered twice by the same electrons: first, on their outward run, under the shape of a narrow primary beam, and then on their return travel under the shape of a spread-out secondary beam.

An important drawback then presents itself if one desires to make a photographic record of the final image, due to the obvious fact that it is necessary to receive the secondary beam onto a sensitive surface, such as a photographic plate, for example; the said surface, indeed, interposes itself on the way of the primary beam, which, in the absence of a special disposition, is bound to be also intercepted.

Up to the present time a means of overcoming that difficulty has consisted in a small central hole disposed in the plate for passing the primary beam through it, but the plates so perforated have proved to be rather delicate to produce. My invention has for object to eliminate the above difficulty. It consists in simultaneously adopting the two following means:

(1) The rigid photographic plate is replaced by a flexible film, which is rolled up in the apparatus, and which permits the recording of several successive images.

(2) The flexible film is composed of two separate parallel bands, the nearest edges of which are separated by a narrow free space, or interval, or gap. This latter is narrow enough for enabling the final image to cover the film throughout almost its entire area, though the gap leaves a free passage for a small protecting metal sleeve, through which the incident electron beam may be directed in its passage from the objective towards the mirror. Both bands of the flexible film are wound up around the same receiving roller and are simultaneously driven together.

As a nonlimitative instance, it can be stated that the free space separating the two bands may have a width averaging 0.5 to 1.00 mm. with the objectives now in use.

The drawing schematically represents one of the embodiments of my invention wherein reference character 1 designates the emitting filament or cathode constituting the source of electrons for directing the incident beam of electrons through the perforated plate element 2 for accelerating the electrons through the aperture 4 of the objective 3. The objective 3 is in the form of a plate centrally apertured at 4 for the passage of the incident beam of electrons and constitutes a unit of the focalization electrodes traversed by the electron beam. The incident beam of electrons is directed through the small metallic sleeve or tube 5 which is aligned with the central aperture 4 in the objective 3 and connected with a source of potential that is negative with respect to filament 1. The sleeve or tube 5 is not a focalization electrode but serves simply as a guide for the narrow pencil beam of the incident electrons upon the reflecting mirror 6 aligned therewith. The reflecting mirror 6 is in the form of a cupel with its concavity directed towards films 7 and 8 and connected as a whole with a source of potential negative with respect to emitting filament 1, which reflects the incident beam of electrons in diverging beams from mirror 6 to the two bands of flexible film represented at 7 and 8 arranged on either side of the sleeve or tube 5. The bands 7 and 8 are carried by rollers 9 and 10 journaled on spaced parallel axes on opposite sides of the sleeve or tube 5. A narrow space 11 is provided between the two flexible films 7 and 8 as represented at 11 for the passage of the electron guide sleeve or tube 5. The flexible film is supported on one of the rollers and is unwound therefrom and rolled up on the opposite roller.

While I have described my invention in one of its preferred embodiments I realize that modifications in detail may be made and I intend no limitations upon my invention other than may be imposed by the scope of the appended claims.

What I claim is:

1. In an electron microscope comprising an electron emitting filament, an acceleration anode, a focalization objective, and an electron reflection mirror, two photographic films disposed side by side on the same plane, in the vicinity of the said objective, and separated by a very small interval sufficient for letting the electron beam pass after its focalization by the said objective and before its reflection on the said mirror.

2. In an electron microscope according to claim 1, a winding and unwinding arrangement for the two said films on which, after reflection, the final enlarged image of the object to be observed is formed.

3. In an electron microscope according to claim 1, in which there is disposed in the said interval separating the said two films, a metal tube traversed by the electron beam after its focalization by the said objective and before its reflection on the said mirror and means for connecting the said tube with a potential permitting the conservation of the focalization of the said beam during its passage through the said tube.

PIERRE GRIVET.

REFERENCES CITED

The following references are of record in the file of this patent:

UNITED STATES PATENTS

| Number | Name | Date |
|---|---|---|
| 2,222,955 | Orthuber | Nov. 26, 1940 |
| 2,264,709 | Nicoll | Dec. 2, 1941 |
| 2,332,876 | Uhlmann | Oct. 26, 1943 |